United States Patent [19]
Kato et al.

[11] Patent Number: 4,812,002
[45] Date of Patent: Mar. 14, 1989

[54] OPTICAL COUPLING DEVICE AND METHOD OF MAKING THE SAME

[75] Inventors: Takeshi Kato, Kokubunji; Kenichi Mizuishi, Hachioji; Katuaki Chiba, Akigawa, all of Japan

[73] Assignee: Hitachi, Ltd., Tokyo, Japan

[21] Appl. No.: 111,590

[22] Filed: Oct. 23, 1987

[30] Foreign Application Priority Data

Oct. 24, 1986 [JP] Japan .................................. 61-251640
Feb. 18, 1987 [JP] Japan .................................. 62-33270

[51] Int. Cl.⁴ .............................................. G02B 6/42
[52] U.S. Cl. .............................. 350/96.18; 350/96.20
[58] Field of Search .............. 350/96.15, 96.17, 96.18, 350/96.19, 96.20, 96.21, 96.22; 250/227, 552; 357/17, 19, 30, 74

[56] References Cited

U.S. PATENT DOCUMENTS

| | | | |
|---|---|---|---|
| 4,326,771 | 4/1982 | Henry et al. | 350/96.15 X |
| 4,368,481 | 1/1983 | Ohashi et al. | 357/19 X |
| 4,474,429 | 10/1984 | Yoldas et al. | 350/96.20 X |
| 4,601,535 | 7/1986 | Tanaka et al. | 350/96.15 X |

FOREIGN PATENT DOCUMENTS

| | | | |
|---|---|---|---|
| 213792 | 9/1984 | German Democratic Rep. | 350/96.20 |
| 53-96849 | 8/1978 | Japan | 350/96.20 |
| 57-28392 | 2/1982 | Japan . | |
| 58-190908 | 11/1983 | Japan | 350/96.15 |

*Primary Examiner*—John D. Lee
*Attorney, Agent, or Firm*—Fay, Sharpe, Beall, Fagan, Minnich & McKee

[57] ABSTRACT

Disclosed are an optical coupling device including an optical device, an optical fiber, and a guide, and a method for their production. The guide has a through-hole whose diameter is smaller than the outer diameter of the optical fiber. The through-hole is optical-axis aligned with the optical device. An end of the optical fiber is processed in such a manner that its diameter is decreased, and is fitted into the through-hole so as to optically couple the optical fiber to the optical device.

17 Claims, 6 Drawing Sheets

OPTICAL COUPLING DEVICE AND METHOD OF MAKING THE SAME

BACKGROUND OF THE INVENTION

The present invention relates to an optical coupling device and a method of making such a device which can readily provide highly efficient optical coupling between an optical device and an optical fiber.

In a known optical coupling device, such as that disclosed in the specification of Japanese Patent Laid-Open No. 28392/1982, a through-hole is provided in a guide for an optical fiber in such a manner that its diameter is larger than the outer diameter of the optical fiber, and the optical fiber is inserted into the through-hole and fixed thereto so as to optically couple the optical fiber to an optical device.

In the above-described known optical coupling device, however, since the aperture of the through-hole is larger than the outer diameter of the optical fiber, the insertion of the optical fiber into the through-hole does not ensure accurate positioning of the optical fiber. Therefore, in the assembly process, after the optical fiber has been inserted into the through-hole provided in the guide, and has been fixed thereto, the optical axis of the optical fiber is aligned with the optical device by holding the guide by a micro manipulator, and the guide is then fixed to a case which contains the optical device.

In this known type of optical coupling device, if several optical devices are to be integrated to form an array, the optical axes of the optical fibers must be individually aligned with the corresponding optical devices. Further, space is needed to provide a guide for each optical fiber and conduct the alignment work. This inhibits any reduction in size of and integration of the optical coupling device. In addition, when these known optical coupling devices are assembled into an optical integrated module, it is very difficult to align the optical axis of each of the optical fibers within the small module.

SUMMARY OF THE INVENTION

Accordingly, an object of this invention is to provide an optical coupling device and a method of making it which can cope with the integration of optical devices, which ensure a simple assembly process, which enable optical fibers to be removed and remounted if necessary, and which are suitable for mass production.

The above-described object can be achieved by providing an optical coupling structure characterized in that a guide has a through-hole whose diameter is smaller than the outer diameter of an optical fiber, in that the through-hole is aligned with the optical axis of an optical device, in that an end of the optical fiber is processed in such a manner that its diameter is decreased (for example, it is processed to form a tapered end), and in that the end is fitted into the through-hole so as to optically couple the optical fiber to the optical device.

When the end portion of the optical fiber is fitted into the through-hole, the end portion is in point-, line-, or area-contact with the through-hole, so that the end portion is positioned mechanically. Therefore, if the through-hole is aligned with the optical device beforehand, highly efficient optical coupling between the optical device and the optical fiber is provided by simply fitting the end portion into the through-hole.

Even if optical devices are integrated to form an array, they can be aligned with the corresponding through-holes in one operation if array of the through-holes is processed in one guide with a high degree of accuracy. After the alignment of the through-holes is completed, the optical fiber array is fitted into the through-hole array. In other words, the assembly process is simplified. In addition, since only one guide is used, its size can be reduced. Also, no space for alignment is needed, enabling the integration of optical coupling devices.

Even when an optical fiber is repeatedly removed from and returned to its through-hole, the reproducibility of the optical coupling efficiency remains high. Therefore, there is no need to fix the optical fiber to the guide. This enables the guide and the optical fiber to be connected by a connector.

When the optical coupling devices of this invention is to be assembled into an optical integrated module, the alignment of the through-holes is done outside the module, and the optical fibers are simply fitted into the through-holes inside the module. In other words, the alignment of optical axes within the small module can be eliminated.

DETAILED DESCRIPTION OF THE PREFERRED EMBODIMENTS

The present invention will be described by way of example with reference to the accompanying drawings.

Figure 1:
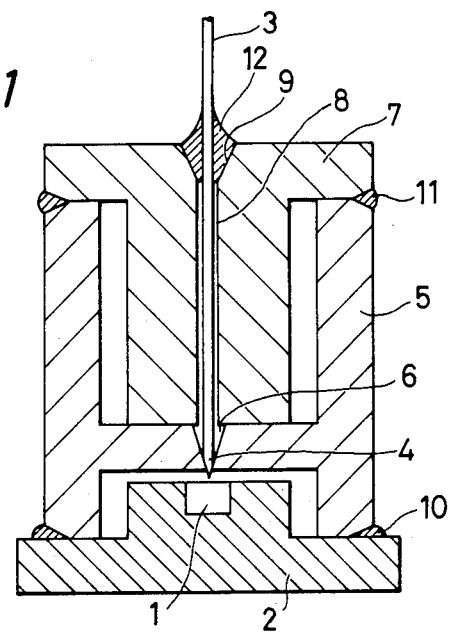
FIG. 1 is a cross-sectional view of an optical coupling device, showing a first embodiment of this invention.
Figure 2:
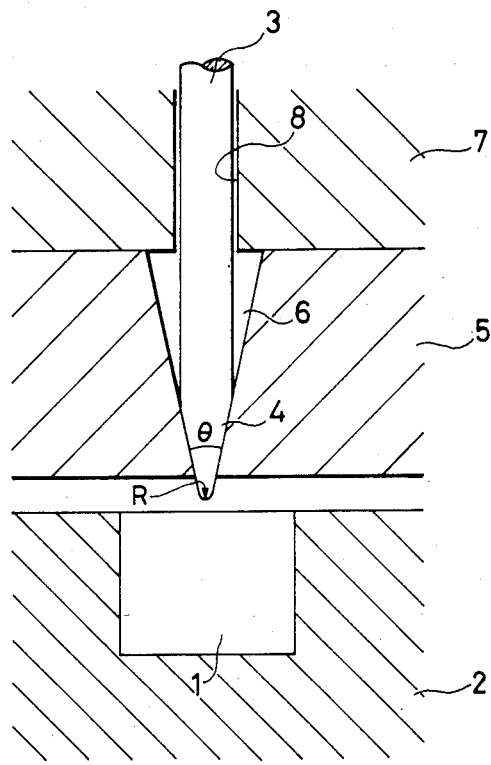
FIG. 2 is an enlarged cross-sectional view of essential parts of the first embodiment.

FIG. 1 is a cross-sectional view of a basic optical coupling device between an optical device and an optical fiber, showing a first embodiment of the present invention, and FIG. 2 is an enlarged view of an essential part of the device of FIG. 1.

In FIGS. 1 and 2, an optical device 1 is fixed onto a mount 2. An optical fiber 3 which is optically coupled to the optical device 1 is supported by a guide 5 and a receptacle 7. The optical fiber 3 is inserted into a through-hole 8 formed in the receptacle 7. A distal end portion 4 of the optical fiber 3 is machined in a tapered fashion in such a manner that the diameter thereof is decreased, and is fitted into a tapered through-hole 6 formed in the guide 5. The mount 2, guide 5, and receptacle 7 are bonded to each other by fixing materials 10 and 11, respectively. The optical fiber 3 is fixed to an opening 9 of the receptacle 7 by a fixing material 12.

The optical device 1 comprises an InGaAsP/InP semiconductor laser diode having an oscillation wavelength of 1.3 μm. The optical device 1 is fixed to the mount 2 by soldering (not shown). The electrodes and leads of the optical device 1 are omitted and not shown.

The optical fiber 3 comprises a single-mode optical fiber having an outer diameter of 125 μm and a core diameter of 9 μm. The distal end portion 4 of the optical fiber 3 is provided with a hemi-spherical lens. The fine hemi-spherical lens having a radius R of 17.5 μm is formed by tapering the distal end portion 4 of the optical fiber 3 by precision grinding (in a cone angle $\theta$ of 25°) and then by fusing the tapered end portion by heating. With the hemi-spherical lens having the above-described radius, optimal optical coupling is ensured when the hemi-spherical lens is separated from the optical device 1 by an interval of about 20 μm. The axial tolerance in optical-axis alignment is ±5 μm, and the lateral tolerance is ±1 μm. The surface of the optical fiber 3 excluding the distal end portion 4 is metallized with Au/Ni to facilitate soldering.

The through-hole 6 formed in the guide 5 is tapered by precision micro drilling in such a manner that it has a cone angle of 25°. The through-hole 6 has the minimum aperture of 50 μm. This is smaller than the outer diameter of the optical fiber 3, 125 μm.

The aperture of the through-hole 8 in the receptacle 7 is 140 μm. The opening 9 is formed in a shape which facilitates the insertion of the optical fiber 3 into the through-hole 8.

The mount 2, guide 5, and receptacle 7 are made of Kovar which has a low thermal expansion coefficient. Their surfaces are plated with Au/Ni so as to facilitate soldering. The fixing materials 10, 11 and 12 comprise a solder.

Figure 3:
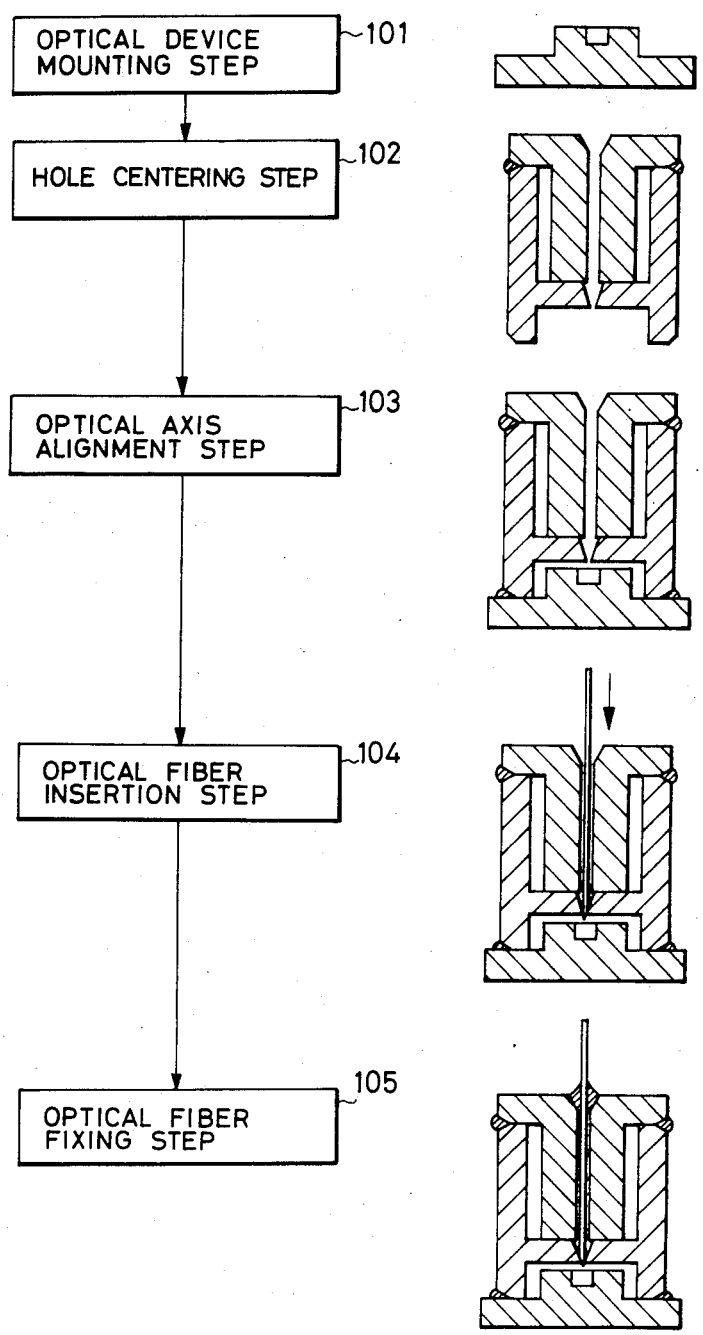
FIG. 3 is a flow diagram of the assembly of the first embodiment.

The optical device of this embodiment is assembled in a procedure shown in FIG. 3. FIG. 3 shows the flowchart of assembly process, as well as the optical device in cross section in each processing step 101~105.

(1) Mounting of optical device

The optical device 1 is fixed to the mount 2 by soldering (not shown). The position of the optical device 1 can be shifted in the direction of optical axis prior to fixing. This is necessary because the length of the distal end portion 4 of the optical fiber 3 which projects from the through-hole 6 is changed by the machining accuracy of the through-hole 6.

(2) Centering of through-holes

After the through-hole 6 formed in the guide 5 and the through-hole 8 in the receptacle 7 are centered, the guide 5 and the receptacle 7 are fixed to each other by the fixing material 11.

(3) Alignment of through-hole

The through-hole 6 is aligned with the optical device 1, and the guide 5 is then fixed to the mount 2 by the fixing material 10. The alignment of the through-hole to the optical device is conducted in either of the following two methods: in the first method, a reference optical fiber is inserted into the through-holes 6 and 8 and is aligned with the optical device 1 so as to optical-axis align it with the optical device 1. The reference optical fiber is then removed from the through-holes. In another method, the position of the guide 5 is adjusted so that the intensity of light emitted from the optical device 1 and passing through the through-holes 6 and 8 is at a maximum.

(4) Insertion of optical fiber

The optical fiber 3 is inserted into the through-hole 8, and the distal end portion 4 of the optical fiber 3 is fitted into the through-hole 6 so as to optically couple the optical device 1 and the optical fiber 3.

(5) Fixing of optical fiber

If the optical fiber 3 is one which is fixed permanently, it is fixed to the opening 9 of the receptacle 7 by the fixing material 12. It may not be fixed so as to be removed and mounted repeatedly.

Figure 4:
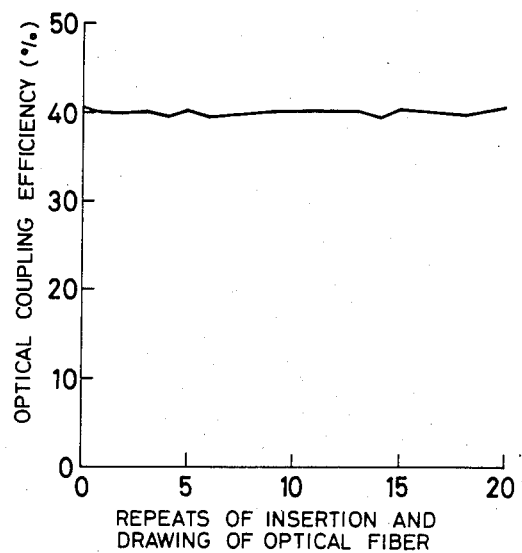
FIG. 4 is a graph showing the characteristics of the first embodiment.

In this embodiment, the tapered distal end portion 4 of the optical fiber 3 is in area-contact with and thereby fitted closely into the tapered through-hole 6, so that the distal end portion can be accurately positioned. If the optical coupling device has been assembled up to step 103 shown in FIG. 3, the distal end portion 4 can be led to an appropriate position by a simple operation of step 104, so as to readily obtain a highly efficient optical coupling. In other words, assembly work is facilitated. Even if the optical fiber 3 is removed and mounted repeatedly after it has been assembled up to step 104, the optical coupling efficiency remains high (see FIG. 4). After the optical fiber 3 has been removed and mounted twenty times, that optical coupling device exhibited an optical coupling efficiency as stable and high as 40±1%. This is equivalent to a fiber distal end positioning accuracy within ±0.5 μm, which proves that the positioning performance of this invention is excellent.

When the optical coupling device of this embodiment is assembled into an optical integrated module, it is assembled up to step 103 outside the module, the steps 104 and 105 being completed afterwards inside the module. In this way, difficult optical-axis alignment work within the narrow module can be eliminated. The thus-formed optical integrated module is particularly suitable for use in optical communications, and ensures stable operation for a long period of time.

In this invention, accurate positioning of the distal end portion of the optical fiber is enabled by a mechanical positioning thereof with respect to the through-hole which is caused by a point, linear, or area-contact between the distal end portion and the through-hole. The accurate positioning is not provided by material which forms the optical coupling device or its machining method.

In this embodiment, the optical fiber is coupled to the optical device which comprises a semiconductor laser diode. However, it may be optically coupled to other optical devices such as an optical source and detector, opto-functional device, or optical waveguide.

The distal end portion of the optical fiber is machined in a tapered fashion. However, it may be machined into another form, if its diameter is decreased. The through-hole may be machined into a form other than a tapered form, so long as it has a minimum aperture which is smaller than the outer diameter of the optical fiber. It may be formed into a shape in which its diameter is unchanged. It is to be noted that, however, if the distal end portion of the optical fiber or the through-hole is shaped into another form, positioning of the distal end portion is not made by the area-contact but by contact at a plurality of points or a linear contact.

In this embodiment, the distal end portion of the optical fiber and the through-hole are formed by precision machining. However, they may be formed by, for example, a chemical etching process or a dry etching process. The diameter of quartz glass fiber is reduced by immersing it into fluorine type solution. When the (100) plane of Si is anisotrophically etched in a KOH aqueous solution, a pyramidal through-hole having a side wall angle of about 70.5° is obtained by the (111) plane. A through-hole may also be formed from Si or $SiO_2$ by a dry etching process using fluorine type gas. In the etching process, an accuracy at which the through-hole is processed is determined by an accuracy at which the pattern is formed on an etching mask. The etching process can produce a through-hole with very high accuracy. It ensures good reproducibility by batch processing, thereby improving mass productivity.

In this embodiment, the optical coupling device consists of an optical device and an optical fiber. However, the present invention can be applied more advantageously to an optical coupling device comprising an integrated optical device array and an integrated optical fiber array, which may be an optical switch or optical parallel computer.

Another embodiment of this invention will now be described with reference to FIGS. 5A to 5D which illustrate an optical coupling device between an optical waveguide array and an optical fiber array.

In the figures, an optical waveguide array 13 is optically coupled to an optical fiber array 16. The optical waveguide array 13 is fixed onto a mount 25. Each of optical fibers 17 which constitute the optical fiber array 16 is supported in each of V-grooves 20 formed in a guide 19, and a distal end portion 18 of each of the optical fibers 17 is fitted into each of through-holes 22 provided in a guide 21. The guides 19 and 21 and the mount 24 are fixed to each other. The guide 21 is spaced away from the optical waveguide array 13 by a spacer 23.

The optical waveguide array 13 comprises I/O terminals of an optical multi-connection device such as an optical switch. It includes a substrate 14, and four optical waveguides 15 formed on the substrate 14 in such a manner that they are separated from each other at a 160-μm spacing. The substrate 14 is made of InP. The optical waveguides 15 each comprise a ridge type InGaAsP optical waveguide which has a waveguide width of 4 μm and a thickness of 2 μm, and which is capable of single-mode transmitting a light of wavelength of 1.15 μm. The optical waveguides 15 are produced by utilizing semiconductor processing techniques such as photolithography and etching.

The optical fiber array 16 consists of four optical fibers 17. The optical fibers 17 are separated from each other at a 160-μm spacing. The optical fibers 17 each comprise a single mode optical fiber having an outer diameter of 125 μm. The distal end portion 18 of each of the optical fibers 17 is tapered (into a cone angle of 30°), and is provided with a hemi-spherical lens having a radius of 15 μm. The distal end portions 18 are separated from the optical waveguides 15 by a gap of 20 μm. This gap can be adjusted by the spacer 23. The axial tolerance in an optical-axis alignment of the distal end portion 18 is ±5 μm, and the lateral tolerance is ±1 μm.

The guides 19 and 21 are made of Si. The four V-grooves 20 in the guide 19 and the four through-holes 22 formed in the guide 21 are all formed by an anisotropic etching process of (100) plane of the Si using a KOH aqueous solution. The side-wall angles of each of the V-grooves 20 and the pyramidal through-holes 22 are both 70.5°. If the pattern gaps in the etching masks for the V-grooves 20 and the through-holes 22 are made the same as the pattern gap of the etching mask for the optical waveguide array 13, the array gaps of the V-grooves 20 and the through-holes 22 become equal to that of the optical waveguide array 13, i.e., 160 μm, with high accuracy which is in sub-micron order. The anisotropic etching process also ensures accurate shaping of the V-grooves 20 and the through-holes 22. Thus, the processing accuracy of the V-grooves 20 and through-holes 22 is within the axial and lateral tolerance of the optical fibers 17. Consequently, it can be estimated that variations in optical coupling efficiency are very small. The guides 19 and 21 are bonded to each other as a unit. To bond them, a glass film is deposited on the surfaces of the guides 19 and 21 to be bonded. Thereafter, the positions of the guides 19 and 21 are adjusted, and high voltage is then applied therebetween so as to perform Si-glass-Si bonding.

The mounts 24 and 25 are made of Kovar. The surfaces of the mounts are plated with Au/Ni.

The optical waveguide array 13 and the mount 25, the guides 19 and 21 and the mount 24, and the mounts 24 and 25 are respectively fixed by soldering. The surfaces of the optical waveguide array 13 and the guides 19 and 21 to be bonded are metallized with Au/Ni/Ti beforehand. The spacer 23 for adjusting the gap may or may not be fixed. If it is fixed, soldering is employed for fixing.

The optical coupling device of this embodiment will be assembled in the following manner which is essentially the same as that of the first embodiment. The optical waveguide array 13 is fixed to the mount 25. Next, the guides 19 and 21 which have been integrated as a unit is fixed to the mount 24. At this time, the position of the guides 19 and 21 is adjusted by the spacer 23, and the array of through holes 22 is aligned with the optical waveguide array 13 by holding the mount 24 by a micro manipulator. Thereafter, the mounts 24 and 25 are fixed to each other. The optical fiber array 16 is then inserted and fitted into the through-holes 22. In this way, each of the distal end portions 18 comes in contact with the corresponding through-hole 22 at four points and is positioned with high accuracy with respect to the optical waveguide, so that the optical fiber array 16 can be optically coupled to the optical waveguide array 13 efficiently.

In this embodiment, the optical fibers are optical-axis aligned with the optical waveguides as an array in one operation, whereas in the prior art the optical-axis alignment is conducted to each sub-unit which consists of the optical fiber 17 and the optical waveguide 15. In other words, the assembly processes can be simplified greatly.

Further, if the integration of the optical waveguides 15 is improved, the guides 19 and 21 can be integrated accordingly, enabling the optical coupling device to be integrated. As in the first embodiment, the optical fiber array 13 can be removed and remounted repeatedly, simplifying the assembly of an optical integrated module. In this embodiment, variations in the optical coupling efficiency between the optical waveguide and optical fiber in four sub-units was as small as ±2%, despite the single mode optical coupling. This proves that the present embodiment is reliable.

Optical coupling devices which utilize the V-grooves formed in a guide made of Si have been known. Such a structure is equivalent to this embodiment from which the guide 21 has been removed. In the known structure, the outer periphery of each of the optical fibers is supported by the corresponding V-groove. In consequence, the dimension accuracy of the outer diameter of the optical fiber or decentering of a core affects shifting of the distal end portion of an optical fiber, generating variations in the optical coupling efficiency of each optical fiber. The provision of V-grooves alone does not ensure accurate positioning of the optical fiber in the axial direction. In the present invention, the optical fiber is supported at a portion which is closer to its optical axis, and the positioning of the distal end portion is far less influenced by the outer diameter dimension accuracy and the decentering of the core, minimizing the variations in the optical coupling efficiency. The optical fiber can also be positioned stably in the axial direction by the fitting.

The above-described advantages of this embodiment are not restricted by the components or processing method. In this embodiment, each of the optical waveguides comprises a semiconductor optical waveguide. However, it may be a dielectric waveguide such as LiNbO$_3$. The present embodiment can also be applied to an optical coupling device which includes an optofunctional device array in place of the optical waveguide array. The performance of an optical multi-connection device can be improved by increasing the number of optical waveguides in an array from 4 to 8, or further to 16. If the present embodiment is applied to an optical switching device, a large number of optical links can be switched on and off by a small device, improving the performance of the switching device greatly. The optical coupling device of this embodiment employs one-dimensional arrays. However, two-dimensional arrays may also be employed without any problems. Another embodiment which employs these two-dimensional arrays will be described below.

Figure 6A:
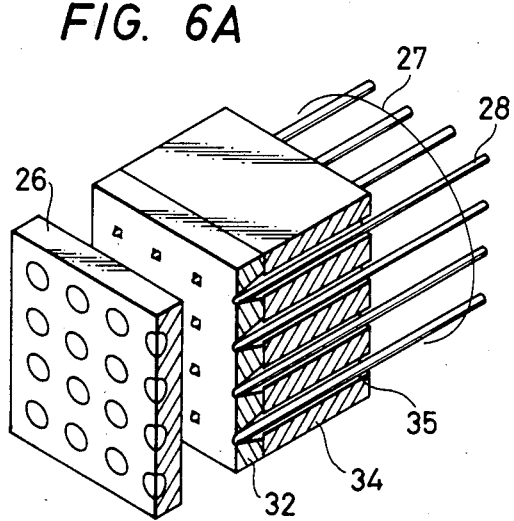
FIG. 6A is a perspective view, partly in cross-section, of an optical coupling device, showing a third embodiment of this invention.
Figure 6B:
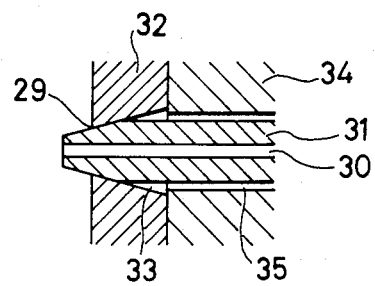
FIG. 6B is a cross-sectional view of an essential part of the optical coupling device of FIG. 6A.
Figure 5B:
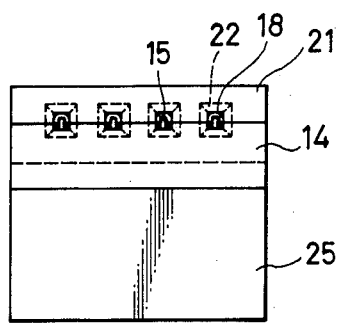
FIG. 5B is a front elevational view of the optical coupling device of FIG. 5A, as seen when looking from the direction of optical waveguide array.
Figure 5A:
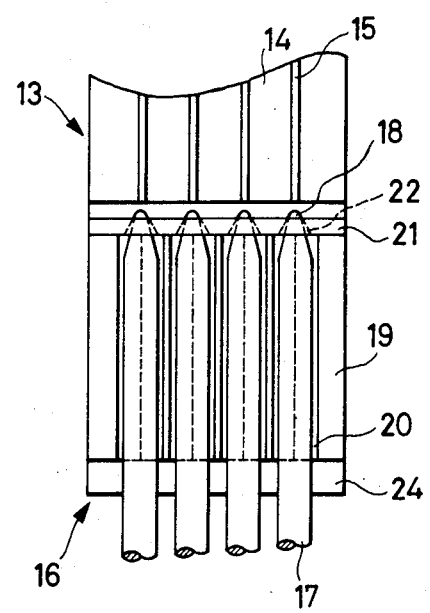
FIG. 5A is a plan view of an optical coupling device, showing a second embodiment of this invention.
Figure 5C:
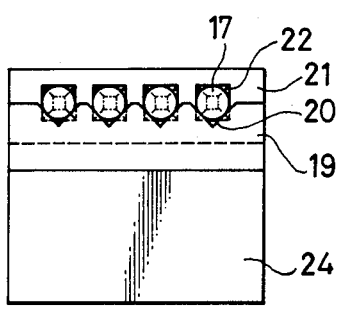
FIG. 5C is a front elevational view of the optical coupling device of FIG. 5A, as seen when looking from the direction of optical fiber array.
Figure 5D:
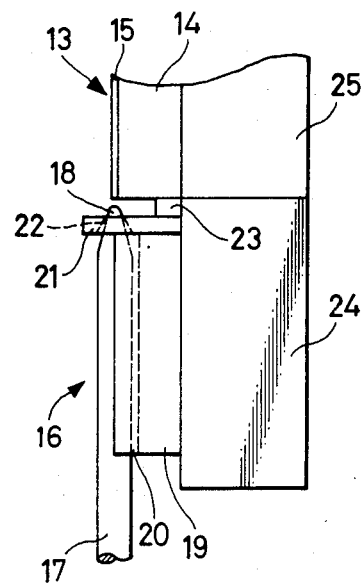
FIG. 5D is a side elevational view of the optical coupling device of FIG. 5A.

FIG. 6A is a perspective view of an optical coupling device of a two-dimensional micro-lens array and a two-dimensional fiber array, and FIG. 6B is an enlarged view of part of the optical coupling device of FIG. 6A.

In FIG. 6A, a two-dimensional micro-lens array 26 is optically coupled to a two-dimensional fiber array 27. Optical fibers 28 are respectively inserted into through-holes 35 formed in a guide 34, and distal end portions of the optical fibers 28 are fitted into through-holes 33 provided in a guide 32.

The two-dimensional micro-lens array 26 is formed by conducting electric field-assisted ion exchange to a glass substrate in molten salt. The two-dimensional micro-lens array 26 has a lens diameter of 1.3 mm, a focal length of 1.5 mm, and a lens pitch of 2 mm.

The optical fibers 18 each comprise a quartz type single-mode optical fiber which has a core 30 and a clad 31. A distal end portion 29 of each of the optical fibers 28 is tapered. The distal end of the core 30 is ground vertically.

The guide 32 is made of Si, and the through-holes 33 are formed by an anisotropic etching process in such a manner that they are separated from each other at a 2-mm spacing. Accuracy of the gaps of the through-holes can be controlled by an accuracy at which their etching mask is patterned.

The guide 34 is made of a metal. The surfaces of the guides 32 and 34 to be bonded are metallized and then fixed to each other by soldering. The optical coupling device of this embodiment is assembled in the same processes as in the first and second embodiments.

This embodiment enables batch optical coupling of a two-dimensional fiber array. High optical coupling efficiency is ensured by fitting the two-dimensional fiber array into the through-hole array, and the variations in the optical coupling efficiency is very small. A combination of this embodiment and a two-dimensional optical device array such as an all-optical bistable device is capable of optical parallel operations. It is also possible to improve the parallel operation capability of the optical coupling device by increasing the number of devices or optical fibers in an array from 4×4, to 8×8, and further to 16×16. This embodiment can be used as an essential part of an optical computer.

Figure 7A:
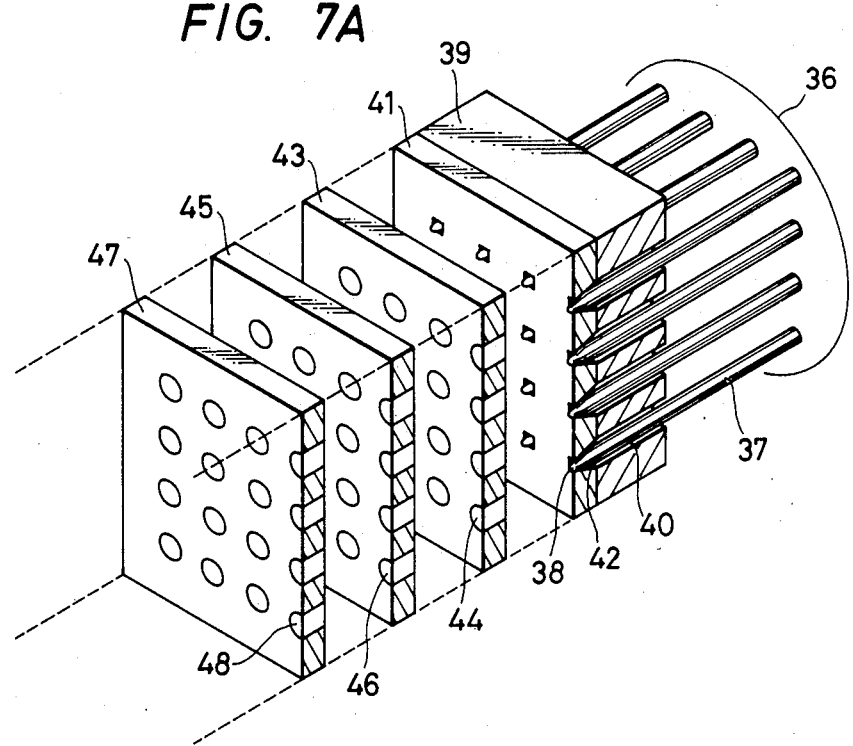
FIG. 7A is an exploded perspective view, partly in cross-section, of an optical coupling device, showing a fourth embodiment of this invention.
Figure 7B:
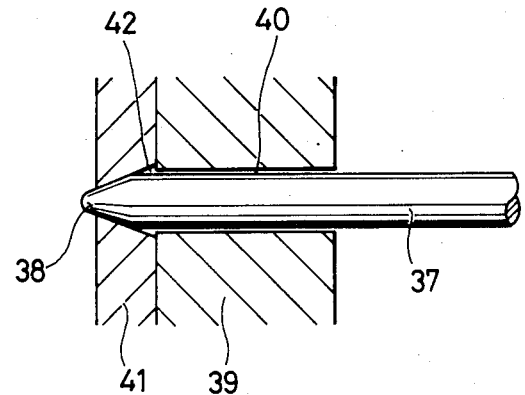
FIG. 7B is a cross-sectional view of an essential part of the optical coupling device of FIG. 7A.

Another embodiment of the present invention will be described below with reference to FIGS. 7A and 7B which are respectively perspective and partially enlarged views of an optical coupling device for stacked optical circuits.

In the figures, stacked two-dimensional optical logic device arrays 43, 45, and 47 are coupled to a two-dimensional fiber array in such a manner that the entirety forms stacked optical circuits. Optical fibers 37 are respectively inserted into through-holes 40 formed in a guide 39, and distal end portions 38 of the optical fibers 37 are fitted into through-holes 38 in a guide 41. Each of the optical fibers 37 is optically coupled to corresponding optical logic devices 44, 46, and 48 in the two-dimensional optical logic device arrays 43, 45, and 47 so as to input and output the results of optical logic operations through the optical fiber 37.

The optical fibers 37 each comprise a single-mode optical fiber. In order to integrate them to form a two-dimensional array, the present embodiment employs optical fibers having a smaller outer diameter than usual. The distal end portion 38 of each of the optical fibers 37 is provided with a hemi-spherical lens so as to improve the coupling efficiency.

The optical logic devices 44, 46, and 48 each comprise a semiconductor device which exhibits optical bistability. The optical logic devices have a function of switching an input or output light beam.

The guides 39 and 41 and the optical coupling device of this embodiment are assembled in the same procedure as that employed in the previous embodiment.

In the stacked optical circuits of this embodiment, since the logical operations can be conducted in parallel, the operation speed can be increased. This embodiment employs 4×4 arrays. Even if the number of devices or optical fibers in an array increases, coupling efficiency between the optical fibers and the optical logic devices remains high. This proves that the present invention is capable of positioning the optical coupling device accurately.

The present embodiment employs semiconductor devices as optical logic devices. However, another dielectric devices such as electro-optic devices or magneto-optic devices may also be employed. The optical coupling device of this embodiment performs logical operations (digital operations). However, it may perform analog operations by using holograms in place of the logical devices. The through-holes into which the optical fibers are inserted are formed by a wet etching process or a dry etching process which ensures fine processing (including reactive ion etching and ion beam etching processes). The optical circuits may include more than three stacked arrays.

Figure 8:
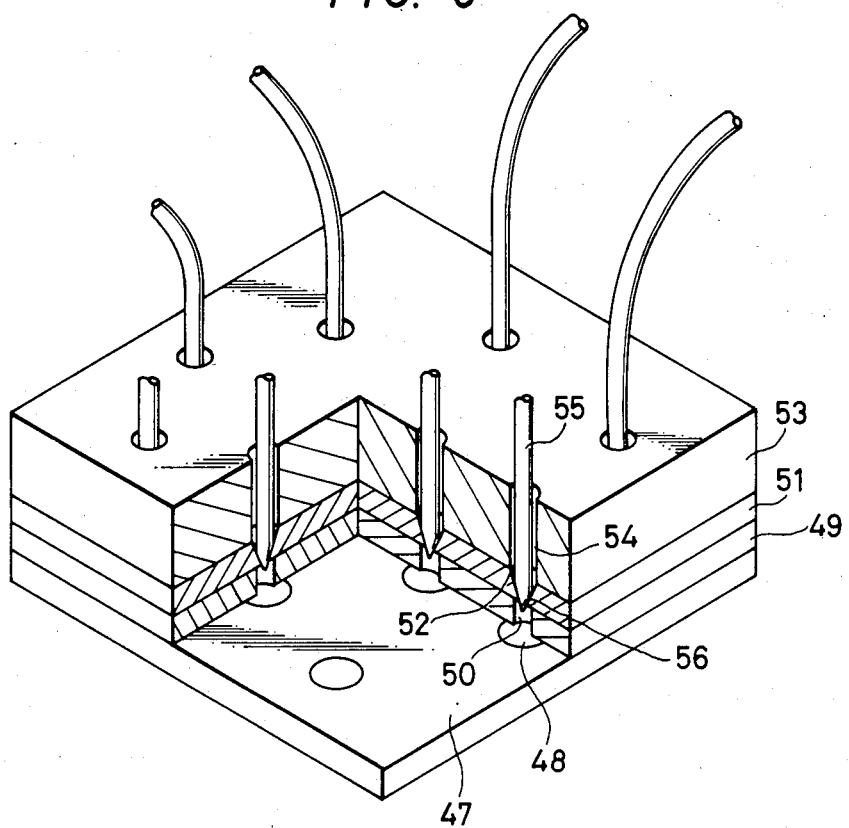
FIG. 8 is a perspective view, with a portion broken away, of an optical coupling device, showing a fifth embodiment of this invention.

FIG. 8 is a perspective view of an optical coupling device which is applied to an optical interconnection, showing a still another embodiment of the invention.

In the figure, large scale integrated circuits (LSI) 47 and an external portion are coupled by an optical link which employs optical fibers 55. The LSI 47 is provided with a plurality of light emitting/detecting devices 48 which convert electrical signals into optical signals and vice versa. Each of the light emitting/detecting devices 48 is coupled to the corresponding optical fiber 55. The optical fibers 55 connect the LSI 47 and the external portion by optical signals. The optical fibers 55 are inserted into through-holes 54 in a guide 53, and the distal end portion 56 of each of the optical fibers 55 is fitted into a corresponding through-hole 52 formed in a guide 51. A spacer 49 has through-holes 50, by means of which it maintains the optical fibers 55 at an appropriate distance from the corresponding light emitting/detecting devices 48. The distal end portion 56 of each of the optical fibers 55 is provided with a hemi-spherical lens so as to improve the optical coupling efficiency.

Any position on the LSI and the external portion can be three-dimensionally connected by an optical link according to the present embodiment. In consequence, a problem of signal delay can be overcome, which would occur in an electrical wiring owing to its capacity, and the speed at which the LSI processes signals is increased. The optical link is also free from a problem of mutual crosstalk, unlike the electric wiring. Since the electric wiring is not needed, the LSI can be designed more freely and integrated at a higher density. In the optical coupling device of this embodiment, the optical fibers can be removed and remounted repeatedly. This enables a programmable optical interconnection network to be formed. Thus, this embodiment ensures operation of the LSI at higher speed, integration of the LSI at a higher density, and more sophisticated functions thereof.

In the present invention, assembly process of an optical coupling device can be simplified, its mass productivity can be increased, and the size of the device can be reduced while the integration is improved. In consequence, it is possible to further improve an optical information parallel transmission ability of optical fibers.

What is claimed is:

1. An optical coupling device comprising:
   an optical device;
   an optical fiber having a first optical axis, a greatest outer diameter and a distal end tapered to exhibit a least outer diameter, said distal end having a terminal portion formed into a hemispherical lens;
   a receptacle having a channel extending throughout the length of the receptacle and receiving said optical fiber;
   a guide adjoining one end of said receptacle, said guide being disposed between the optical device and the channel of the receptacle and having a through-hole with an inner diameter smaller than the greatest outer diameter of said optical fiber, said through-hole being optical-axis aligned with said optical device, and the inner diameter being larger than the least outer diameter of the distal end of said optical fiber, and said receptacle being displaceable transversely relative to said through-hole to provide optical-axis alignment between said channel and said through-hole,
   said distal end being fitted into said through-hole to optically couple said optical fiber to said optical device.

2. An optical coupling device according to claim 1, wherein said through-hole in said guide is tapered.

3. An optical coupling device according to claim 1, wherein said through-hole in said guide is processed by an etching process.

4. An optical coupling device according to claim 1, wherein:
   a plurality of said optical devices are arranged in an array,
   said guide provides a plurality of said through-holes disposed in optical axis alignment with corresponding ones of said optical devices, and
   said distal ends of a plurality of said optical fibers are fitted into corresponding ones of said through-holes in said guide.

5. A method of making an optical coupling device including an optical device, an optical fiber, a receptacle, and a guide, comprising the steps of:
   processing an optical fiber having a greatest outer diameter by reducing said greatest outer diameter along a distal end portion of said optical fiber to a least outer diameter;
   forming a channel in said receptacle for receiving said optical fiber;
   forming a through-hole in said guide with the inner diameter of the through-hole being smaller than the greatest outer diameter of said optical fiber;
   aligning an optical axis of the through-hole with an optical axis of the channel;
   aligning the optical axis of said through-hole in said guide with the optical axis of said optical device; and
   inserting into said through-hole said distal end portion of said optical fiber.

6. A method of making an optical coupling device according to claim 5, wherein said through-hole formed in said guide is formed by an etching process of said guide.

7. A method of making an optical coupling device according to claim 5, further including a step of fixing said optical fiber onto said receptacle.

8. An optical coupling, comprising:
   a receptacle with a first longitudinal axis having a central portion perforated by a channel having uniform cross-sectional dimensions, extending substantially throughout the length of the central portion;
   said uniform cross-sectional dimensions being greater than the greatest exterior cross-sectional dimensions of an optical fiber; and
   a guide having a central region capable of receiving and adjoining a first end of said central portion, said central region being perforated by a through-hole with a second longitudinal axis coaxially alignable with said first axis of the channel by shifting said central region relative to said central portion and transversely to said first and second axes, said through-hole providing a tapered side-wall conforming in part to exterior surfaces of a tapered distal end of an optical fiber with greatest cross-sectional dimensions of said through-hole being adjacent to said first end of said central portion and least cross-sectional dimensions at an opposite end of said through-hole, said greatest cross-sectional dimensions of said through-hole being greater than the greatest exterior cross-sectional dimensions of the optical fiber and said least cross-sectional dimensions of said through-hole being less than the greatest cross-sectional dimensions of the optical fiber and greater than the least cross-sectional dimensions of the tapered distal end of the optical fiber;

said guide having a base disposable adjacent to a device exhibiting a first optical axis and the second longitudinal axis being coaxially alignable with said first optical axis by moving said guide relative to said device.

9. The coupling according to claim 8, wherein said through-hole is formed in the shape of a truncated pyramid with a plurality of said tapered side walls conforming in part to exterior surfaces of a tapered distal end of an optical fiber.

10. The coupling according to claim 8, further comprising:

an optical fiber having a second optical axis, said greatest exterior cross-sectional dimensions and a distal end tapered to exhibit a least exterior cross-sectional dimension, said distal end having a terminal portion formed into a hemispherical lens, said optical fiber being removably disposed in said channel with said distal end reposing in said through-hole such that said first and second axes substantially coincide.

11. The coupling according to claim 10, further comprising:

a plurality of optical device being arranged in an array;

said guide having a plurality of said through-holes disposed in optical axis alignment with corresponding ones of said optical devices, and said distal ends of a plurality of said optical fibers being fitted into corresponding ones of said through-holes.

12. An optical coupling according to claim 8, further comprising:

said receptacle having a plurality of channels;

said guide having a plurality of said through-holes disposed in optical axis alignment with corresponding ones of a plurality of the devices, and a plurality of said optical fibers each having distal ends removably fitted into corresponding ones of said channels and through-holes.

13. The coupling according to claim 8, further comprising:

an optical fiber having said second optical axis, a greatest exterior cross-sectional dimension and a distal end tapered to exhibit a least exterior cross-sectional dimension, said optical fiber being removably disposed in said channel with the distal end reposing in said through-hole such that said first and second axes substantially coincide.

14. The coupling of claim 13, wherein said through-hole is formed in the shape of a truncated pyramid.

15. The coupling of claim 13, further comprising:

said receptacle having a plurality of said channels;

said guide having a plurality of said through-holes disposed in optical axis alignment with a plurality of the devices, and said distal ends of a plurality of said optical fibers being removably fitted into corresponding ones of said channels and through-holes.

16. The coupling of claim 15, wherein each of said through holes is formed in the shape of a truncated pyramid.

17. The coupling of claim 15, further comprising:

each said distal end having a terminal portion defining a plane transverse to said second optical axis, and an array of micro-lenses with individual ones of the micro-lenses disposed between corresponding ones of said plurality of through-holes and the optical devices.

* * * * *